United States Patent
Kracker et al.

(10) Patent No.: US 7,625,110 B2
(45) Date of Patent: Dec. 1, 2009

(54) VEHICLE LAMP ASSEMBLY

(75) Inventors: Thomas G. Kracker, Marysville, OH (US); Steven M. Kovach, Dublin, OH (US); Tony D. Wang, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/023,895

(22) Filed: Jan. 31, 2008

(65) Prior Publication Data

US 2009/0196063 A1 Aug. 6, 2009

(51) Int. Cl.
*F21V 29/00* (2006.01)

(52) U.S. Cl. .................. 362/547; 362/294; 362/373

(58) Field of Classification Search .............. 362/96, 362/218, 264, 294, 373, 545, 547, 800
See application file for complete search history.

(56) References Cited

U.S. PATENT DOCUMENTS

| | | | |
|---|---|---|---|
| 3,653,709 A | | 4/1972 | Gravett |
| 3,659,092 A | * | 4/1972 | Dayton et al. ............ 362/218 |
| 4,555,748 A | | 11/1985 | Bradley |
| 4,733,335 A | | 3/1988 | Serizawa et al. |
| 4,937,717 A | * | 6/1990 | Betzvog, Jr. ............ 362/373 |
| 5,251,111 A | | 10/1993 | Nagengast et al. |
| 5,357,406 A | | 10/1994 | Saget et al. |
| 6,071,000 A | | 6/2000 | Rapp |
| 6,210,024 B1 | | 4/2001 | Shida |
| 6,412,287 B1 | | 7/2002 | Hughes et al. |
| 6,497,507 B1 | | 12/2002 | Weber |
| 6,595,672 B2 | | 7/2003 | Yamaguchi |
| 6,644,842 B2 | | 11/2003 | Yamaguchi |
| 6,676,283 B2 | | 1/2004 | Ozawa et al. |
| 6,899,444 B1 | | 5/2005 | Biber et al. |
| 6,910,794 B2 | | 6/2005 | Rice |
| 7,114,837 B2 | | 10/2006 | Yagi et al. |
| 7,128,454 B2 | | 10/2006 | Kim et al. |
| 7,144,140 B2 | | 12/2006 | Sun et al. |
| 7,261,448 B2 | * | 8/2007 | Ishida et al. ............ 362/545 |
| 2001/0014029 A1 | | 8/2001 | Suzuki et al. |
| 2004/0202007 A1 | | 10/2004 | Yagi et al. |
| 2005/0047170 A1 | | 3/2005 | Hilburger et al. |
| 2005/0105301 A1 | | 5/2005 | Takeda et al. |
| 2005/0190567 A1 | | 9/2005 | Childers et al. |
| 2006/0104077 A1 | | 5/2006 | Oshio et al. |
| 2006/0181894 A1 | | 8/2006 | Chinniah et al. |

* cited by examiner

*Primary Examiner*—Y My Quach Lee
(74) *Attorney, Agent, or Firm*—Mark E. Duell; Rankin, Hill & Clark LLP

(57) ABSTRACT

A vehicle lamp assembly includes a light source unit (e.g., one or more LEDs) mounted to an associated vehicle for providing illumination and a heat sink thermally coupled to the light source unit for dissipating generated heat therefrom. The heat sink has a main body portion, spaced apart fins extending from the main body portion, and an angled surface section on the main body portion disposed between adjacent ones of the spaced apart fins for urging environmental elements to run off the heat sink.

21 Claims, 6 Drawing Sheets

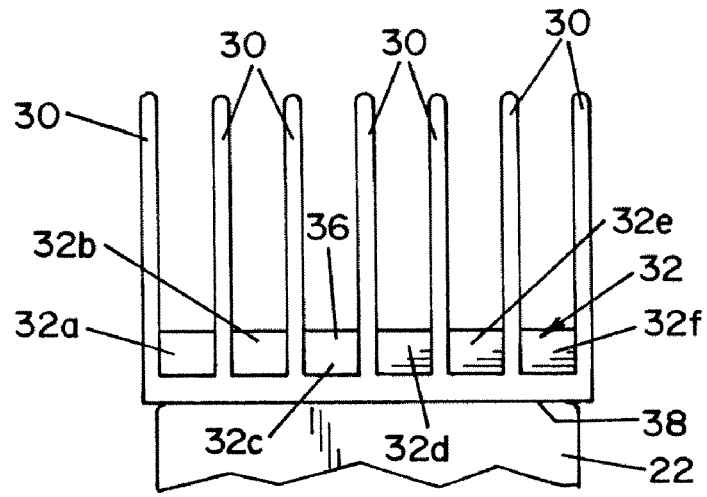
FIG. 3
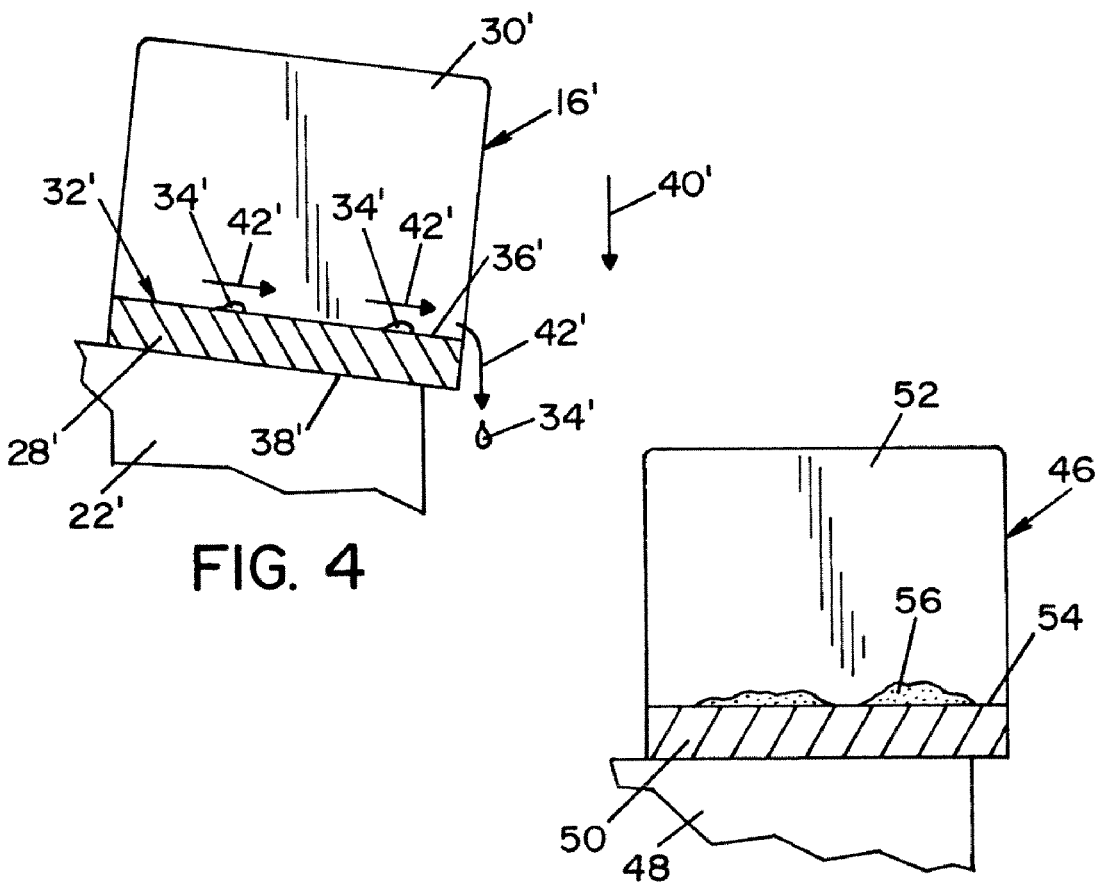
FIG. 4
FIG. 5
(PRIOR ART)

VEHICLE LAMP ASSEMBLY

This application is related to U.S. patent application Ser. No. 12/023,919 entitled "VEHICLE LAMP ASSEMBLY," filed Jan. 31, 2008, commonly assigned to Honda Motor Co., Ltd. and expressly incorporated herein by reference.

BACKGROUND

The present disclosure generally relates to vehicle lamp assemblies, and more particularly relates to an improved vehicle lamp assembly having a heat sink thermally coupled to a light source, such as a light emitting diode (LED), for dissipating generated heat therefrom. In at least one embodiment, the heat sink is designed and/or arranged to urge environmental elements to run off the heat sink in an efficient and effective manner.

Vehicle lamp assemblies employing one or more LEDs as the light source for providing illumination are known to generate heat typically in excess of heat generated from more conventional light sources (e.g., incandescent bulbs). Heat removal is a particular concern in LED lamp assemblies because accumulated heat can degrade the performance of LEDs. In particular, light output from a LED typically decreases as the temperature of the LED increases so care must be taken to avoid allowing heat to accumulate around an LED and raise the temperature to a level that causes the light output or illumination from the LED to drop below an acceptable amount. In addition to performance degradation, excess heat around a LED can even lead to ultimate failure of the LED.

Vehicle lamp assemblies, including LED lamp assemblies, sometimes include heat sinks for purposes of removing heat generated by the light source. For example, a heat sink can be thermally coupled to the light source (e.g., one or more LEDs) for dissipating generated heat therefrom. Such heat sinks often include a plurality of fins for increasing the amount of heat that can be dissipated by the heat sink.

SUMMARY

According to one aspect, a vehicle lamp assembly is provided. More particularly, in accordance with this aspect, the vehicle lamp assembly includes a light source unit mounted to an associated vehicle for providing illumination and a heat sink thermally coupled to the light source unit for dissipating generated heat therefrom. The heat sink has a main body portion, spaced apart fins extending from the main body portion, and an angled surface section on the main body portion disposed between adjacent ones of the spaced apart fins for urging environmental elements to run off the heat sink.

According to another aspect, a LED lamp assembly for a vehicle is provided. More particularly, in accordance with this aspect, the LED lamp assembly includes a lamp housing mounted to an associated vehicle, a LED light source unit operatively mounted to the lamp housing, and a heat sink mounted on an exterior of the lamp housing for dissipating heat generated from the LED light source unit. The heat sink includes a main body portion and heat dissipating fins upstanding from the main body portion. Angled surface sections are disposed between each adjacent pair of the heat dissipating fins for promoting run off of environmental elements received thereon.

According to still another aspect, a vehicle lamp assembly having a LED light source unit is provided. More particularly, in accordance with this aspect, the vehicle lamp assembly having a LED light source unit includes a lamp housing of an associated vehicle and a light source unit operatively mounted in the lamp housing for providing illumination. A heat sink is thermally connected to the light source unit and mounted to an exterior of the lamp housing so as to be exposed to the environment. The heat sink includes a main body portion having a lower surface, spaced apart fins extending upwardly from the lower surface of the main body portion for dissipating heat generated by the light source unit, and surface sections of the lower surface defined between adjacent ones of the spaced apart fins. The surface sections are angularly oriented relative to a horizontal plane for urging and promoting environmental elements off of the heat sink.

BRIEF DESCRIPTION OF THE DRAWINGS

FIG. 3 is an enlarged side elevational view of the heat sink of FIG. 1.

FIG. 4 is an enlarged cross-sectional view of an alternative heat sink and heat sink mounting arrangement for urging environmental elements to run off the heat sink.

FIG. 5 is a cross-sectional view of a conventionally mounted heat sink whereon environmental elements tend to collect and accumulate rendering the heat sink less effective at dissipating heat.

DETAILED DESCRIPTION

Figure 1:
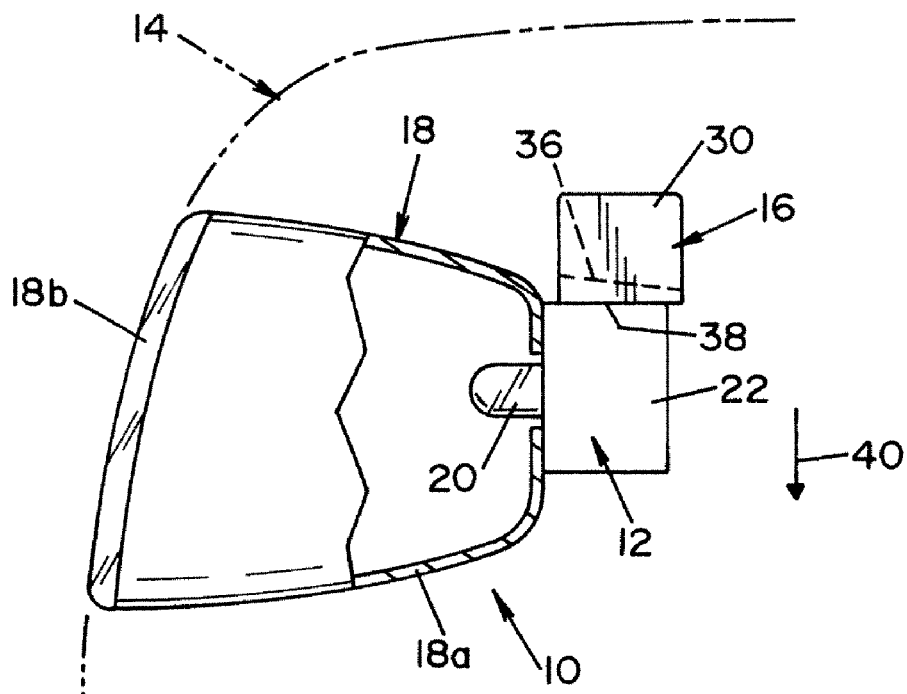
FIG. 1 is a schematic elevational view, partially in cross-section, of a vehicle lamp assembly having a heat sink with an angled surface section for urging environmental elements to run off the heat sink.

Referring now to the drawings, wherein the showings are only for purposes of illustrating one or more exemplary embodiments, FIG. 1 shows a lamp assembly 10 for a vehicle including a light source unit 12. The vehicle lamp assembly 10 and the light source unit 12 can be operatively mounted to an associated vehicle 14 for providing illumination therefor. The lamp assembly 10 could be, for example, a vehicle head lamp, fog light, or the like. The illustrated lamp assembly 10 includes a heat sink 16 thermally coupled to the light source unit 12 for dissipating generated heat therefrom. As shown, the light source unit 12 can be mounted to and/or in a lamp housing 18, which is itself mounted to the associated vehicle 14. The lamp housing 18 can include a main housing portion 18a having reflectors (not shown) for focusing or directing light provided by the light source unit 12 and a lens portion 18b at a forward end for allowing light to pass out of the lamp housing 18.

The light source unit 12 can be a LED package or packages employing one or more LEDs for providing illumination for the vehicle 14. As schematically illustrated, the light source unit 12 can be a LED light source unit including one or more lens portions 20 mounted to a base or support block 22. Alternatively, the light source unit 12 can be a LED light source without a lens portion or the light source unit 12 could comprise one or more conventional light bulbs (i.e., incandescent bulbs) or other light emitting devices. The support block 22 can contain the remainder of a LED package or packages and/or can house control circuitry for controlling the light source unit 12 and/or electrical connections for powering the light source unit 12. In the illustrated embodiment, the one or more lens portions 20 are mounted so as to be positioned within the lamp housing 18 and the support block 22 is mounted to a rear side of the lamp housing 18 forming together with the lamp housing 18 a lamp housing exterior. Thus, the depicted LED light source unit 12 is operatively mounted to the lamp housing 18 with the lens portions 20 mounted within the lamp housing 18 and the support block 22 mounted to the lamp housing exterior.

As shown, the heat sink 16 is thermally coupled to the light source unit 12 of the lamp assembly 10, which can be referred to as a LED vehicle lamp assembly when employing one or more LEDs as the light source unit 12. In particular, the heat sink 16 can be mounted to the support block 22 for dissipating heat generated by the light source unit 12. Because the support block 22 is mounted to the rear side of the lamp housing 18 and forms the exterior of the lamp assembly 10, the heat sink 16 can be considered as being mounted to the exterior of the lamp assembly 10, whereas the light source unit 12 is at least partially housed within the lamp housing 18, particularly the one or more lens portions 20 of the light source unit 12.

Figure 2:
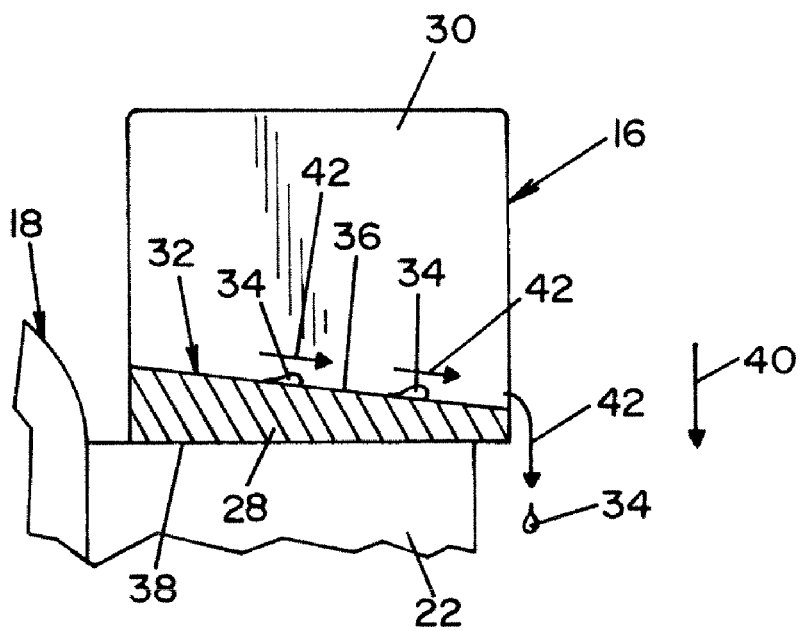
FIG. 2 is an enlarged cross-sectional view of the heat sink showing environmental elements being urged off the heat sink.

With additional reference to FIG. 2, the heat sink 16 has a main body portion 28, spaced apart fins 30 extending from the main body portion 28 and an angled surface section 32 on the main body portion 28 disposed between adjacent ones of the spaced apart fins 30 for urging environmental elements to run off the heat sink 16. In the illustrated embodiment, the fins, which can be referred to as heat dissipating fins, are upstanding relative to or from the main body portion 28. The angled surface section 32, with additional reference to FIG. 3, can be considered a single surface defined in the single plane or a plurality of angled surface sections (such as surface sections 32a, 32b, 32c, 32d, 32e, 32f), one each disposed between adjacent pair of the fins 30 for promoting run off of environmental elements received thereon, such as illustrated environmental elements 34. Of course, as will be understood and appreciated by those skilled in the art, the depicted number of fins 30 or angled surface sections 32a-f need not be as illustrated and can be provided in other shapes and/or configurations other than those illustrated.

The main body portion 28 can alternately be referred to as including a bottom or lower surface 36 from which the fins 30 extend, wherein the angled surface section 32 (or sections 32a-f) is (are) then a portion of the lower surface 36 disposed between adjacent ones of the spaced apart fins 30. Opposite the lower surface 36 and the angled surface section 32 is an opposite or mounting surface 38 that is mounted to the support block 22. As best shown in FIG. 2, the lower surface 36 and the angled surface section 32 which the lower surface includes are formed in a plane oriented at an acute angle relative to a plane in which the opposite surface 38 is formed for purposes of urging the environmental elements 34 to run off heat sink 16 as indicated by arrows 42.

In the embodiment illustrated in FIGS. 1-3, the opposite surface 38 is orthogonally oriented relative to a normal direction of gravity, such as indicated by arrow 40. That is, the opposite surface 38 is normally disposed in a horizontal plane. The normal direction of gravity represented by the arrow 40 is such when the vehicle 14 to which the depicted lamp assembly 10 is mounted is traveling on a surface that is oriented approximately perpendicular relative to gravity. When the vehicle travels on an incline or hill, the normal direction of gravity will be at some other direction than represented by arrow 40. The fins 30 of heat sink 16 depicted in FIGS. 1-3 extend at an acute angle from and relative to the angled surface section 32 and the lower surface 36.

In operation, the heat sink 16 and its angled surface sections 32a-f can be provided on the vehicle 14 such that they are exposed to road and environmental conditions when the vehicle is driven. If allowed to collect on the heat sink 16, environmental elements could degrade the performance of the heat sink and lessen its ability to dissipate heat from the light source unit 12. By being angled acutely relative to the normal direction of gravity 40 (i.e., surface sections 32a-f are not orthogonal relative to the arrow 40 under generally flat driving conditions), the angled surface 32 (or sections 32a-f) promote runoff of the environmental elements 34 as best shown in FIG. 2. That is, the sloped surface 32 directs environmental elements to run off the heat sink 16 and not collect thereon.

With reference to FIG. 4, a heat sink 16' is illustrated according to an alternate embodiment. The heat sink 16' can be thermally coupled to a light source unit (only support block 22' of light source unit shown in FIG. 4) for dissipating generated heat therefrom. Like the heat sink of FIGS. 1-3, the heat sink 16' has a main body portion 28', spaced apart fins (only one fin 30' shown) extending from the main body portion 28', and an angled surface section 32' disposed between adjacent ones of the spaced apart fins for urging environmental elements 34' to run off the heat sink 16'. The main body portion 28' includes a lower surface 36' from which the fins 30' extend, wherein the angled surface section 32' is a portion of the lower surface 36'. The main body portion 28' further includes an opposite surface 38' formed on a side of the main body portion 28' opposite the lower surface or angled surface section 32'.

Unlike the heat sink 16 of FIGS. 1-3, the heat sink 16' is particularly oriented or mounted to the support block 22' for urging the environmental elements 34' to run thereof as indicated by arrows 42'. More particularly, the lower surface 36' and/or angled surface section 32' are formed in a plane generally parallel to a plane in which the opposite surface 38' is formed. As shown, the main body portion 28' is oriented such that the angled surface section 32' is angularly disposed relative to a normal direction of gravity 40'. Unlike the fins 30 of the heat sink 16, the fins 30' extend orthogonally from the lower surface 36', which includes the angled surface section 32'. In other words, the heat sink 16' is positioned on its lamp housing such that the angled surface sections thereof are angularly disposed relative to the horizontal plane (a horizontal plane that is oriented approximately normal relative to the normal direction of gravity 40'). In contrast, in the arrangement depicted in FIGS. 1-3, the opposite surface 38 is disposed in a horizontal plane.

With reference to FIG. 5, a prior art mounting arrangement is shown with a heat sink 46 mounted flatly on a support block 48, which could be a the support block of a light source unit such as a LED. As shown, the heat sink 46 can have, for example, a main body portion 50, spaced apart fins extending from the main body portion 50 (only one fin 52 shown), and a lower surface 54 from which the fins extend (and with surface sections defined between adjacent fins). When exposed to the environment, the illustrated heat sink 46, and particularly the lower surface 54 or portions thereof between adjacent fins, can undesirably collect environmental elements 56 thereon because, unlike the heat sinks 16 and 16', the lower surface is not oriented at an angle and thus there is no gravitational urging on environmental elements on the surface 54 to move these off the heat sink. This can adversely affect the performance of the heat sink 46 and its ability to dissipate heat generated by the light source unit to which it is thermally coupled.

Figure 6:
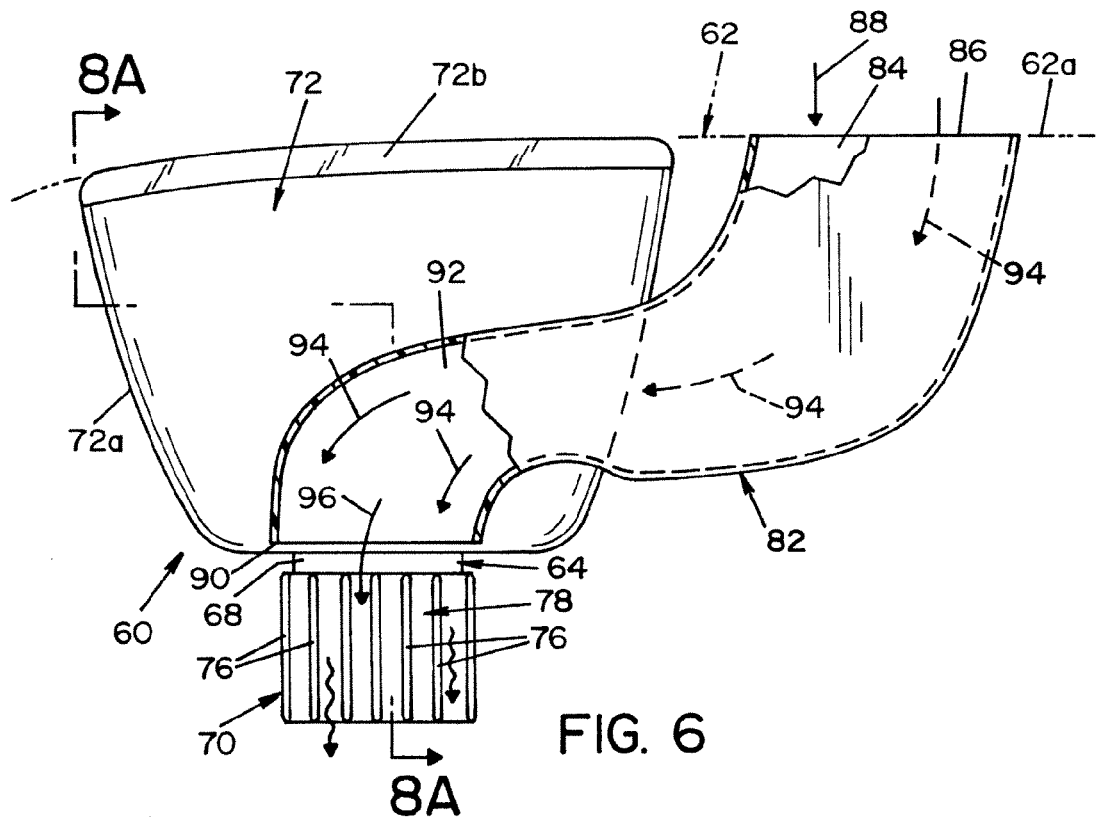
FIG. 6 is a schematic plan view of a lamp assembly for a vehicle, partially in cross-section, having an air guide for guiding airflow to a heat sink thermally coupled to a light source unit of the lamp assembly for removing heat therefrom.
Figure 7A:
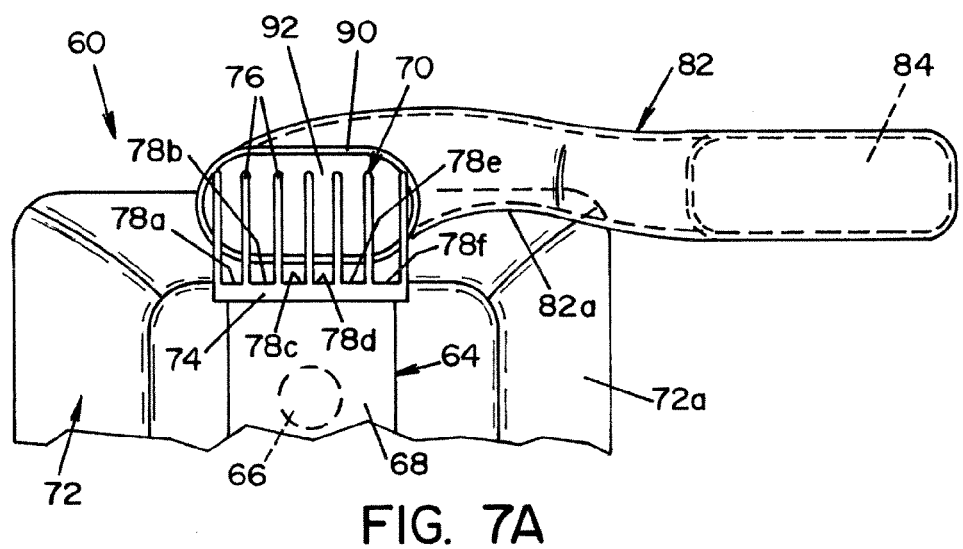
FIG. 7A is a partial rear elevational view of the lamp assembly of FIG. 6.

With reference now to FIGS. 6, 7A and 8, a lamp assembly 60 for a vehicle 62 is shown. The lamp assembly 60 includes a light source unit 64, which can be a LED light source unit, that is operatively mounted to the vehicle 62 for providing illumination therefor. In particular, the light assembly 60 could be, for example, a vehicle head lamp, fog light, or the like, and the light source unit 64 could be a LED package or packages employing one or more LEDs for providing illumination for the vehicle 62. As schematically shown, the light source unit 64 can be a LED light source unit including one or more lens portions 66 mounted to a base or support block 68. The support block 68 can contain the remainder of a LED package or packages and/or can house control circuitry for the light source unit 64 and/or electrical connections for powering the light source unit 64. As will be understood and appreciated by those skilled in the art, the light source unit 64 could alternatively comprise one or more conventional light bulbs or other light emitting devices.

The illustrated lamp assembly 60 includes a heat sink 70 thermally coupled to the light source unit 64 for dissipating heat therefrom. As shown, the light source unit 64 can be mounted to and/or in a lamp housing 72, the lamp housing being mounted to the vehicle 62. Like the lamp housing 18, the lamp housing 72 can include a main housing portion 72a having reflectors (not shown) for focusing or directing light provided by the light source unit 64 and a lens portion 72b at a forward end for allowing light to pass out of the lamp housing. As shown, and like the embodiments of FIGS. 1-4, the one or more lens portions 66 can be mounted so as to be positioned within the lamp housing 72 and the support block 68 can be mounted to a rear side of the lamp housing 72 forming together with the lamp housing 72 a lamp housing exterior.

As shown, the heat sink 70 is thermally coupled to the light source unit 64 of the lamp assembly 60. In particular, the heat sink 70 can be mounted to the support block 68 for dissipating heat generated by the light source unit 64. Since the support block 68 is mounted to the lamp housing exterior, the heat sink 64 is mounted outside of the lamp housing 72 but thermally coupled to light source unit 64, at least a portion of which (i.e., lens portion 66) is mounted or housed within the lamp housing 72. In one embodiment, the heat sink 70 can be constructed the same or similar to one of the heat sinks 16 or 16' discussed hereinabove (e.g., having an angled surface section or sections).

As shown, the heat sink 70 can include a main body portion 74, spaced apart fins 76 extending from the main body portion 74 and a surface section 78 (or sections 78a-f) on the main body portion 74 disposed between adjacent ones of the spaced apart fins 76. Although not shown, the surface sections 78a-f can be constructed so as to be angled relative to a horizontal plane when the heat sink is mounted flatly (like heat sink 16) or can be angularly oriented by mounting the heat sink at an appropriate angle (like heat sink 16'). Alternatively, as will be appreciated by those skilled in the art upon reading the subject disclosure, the heat sink 70 could be of some other construction suitable for dissipating heat from the light source unit 64.

As shown, an air guide 82 is secured to the vehicle 62 for guiding air to the heat sink 70 to remove heat therefrom more rapidly than would otherwise be achieved without the air guide. The arrangement of the light source 64, heat sink 70 and air guide 82, collectively referred to herein as a vehicle lamp cooling assembly, provides for rapid heat removal from the heat sink 70, particularly during driving of the vehicle 62. The air guide 82, alternately referred to herein as an air duct, is specifically formed in a bumper portion 62a of the vehicle 62. The air guide 82 of the illustrated embodiment of FIGS. 6, 7A and 8A includes or has an air guide inlet 84 formed at a first end 86 of the air guide 82 for receiving an airflow from atmosphere represented by arrow 88, particularly when the vehicle 62 is moving. A second end 90 of the air guide 82 is positioned adjacent the heat sink 70 so as to guide or pass the airflow to the heat sink to facilitate heat dissipation by the heat sink.

In particular, the air guide 82 defines or has a passageway 92 extending between the first end 86 and the second end 90 for directing the airflow 88 received in the inlet 84 to the second end 90, as indicated by arrows 94. The air guide 82 is positioned to guide the airflow therealong and discharge the same onto the heat sink 70 as indicated by arrows 96. Particularly, the air guide 82 is positioned to guide air, including airflow 88, to the fins 76 of the heat sink 70. More particularly, the air guide 82 and the spaced apart fins 76 are oriented relative to one another such that the air guide 82 directs air between the fins 76 when the vehicle 62 is moving. Alternatively, though not shown, the air guide 82 can be oriented to direct airflow guided therethrough when the vehicle is moving to a location immediately above the heat sink 70.

As best illustrated in FIG. 6, the air guide 82 defines the passageway 92 as a circuitous path, also referred to herein as a serpentine-shaped or sinuous path or passage, from the first end 86 that is open to an open air source (i.e., atmosphere) to the second end 90 located at the heat sink 70. The circuitous path or passageway 92 for the airflow prevents or reduces (i.e., inhibits) the possibility of environmental elements from passing through the air guide 82 to the heat sink 70. Moreover, the air guide 82 can have an elevated or raised portion 82a forming an apex disposed between the first and second ends 86,90 along the circuitous passage 92. The raised portion 82a can redirect particles or environmental elements that enter the inlet 84, but are unable to pass through the circuitous passage 92, back out the inlet 84 to atmosphere. Additionally, air flow passing the apex or raised portion 82a is subsequently directed downwardly onto the heat sink 70.

In the construction depicted, the light source 64 and heat sink 70 are positioned internally relative to the bumper portion 62a, or at least a forward edge thereof, of the vehicle 62. In this configuration, the air guide 82 is formed through the bumper portion 62a with the inlet 84 forming an aperture in the bumper portion 62a that is open to atmosphere. Passageway 82 extends into the bumper portion 62a to the heat sink 70.

Figure 8B:
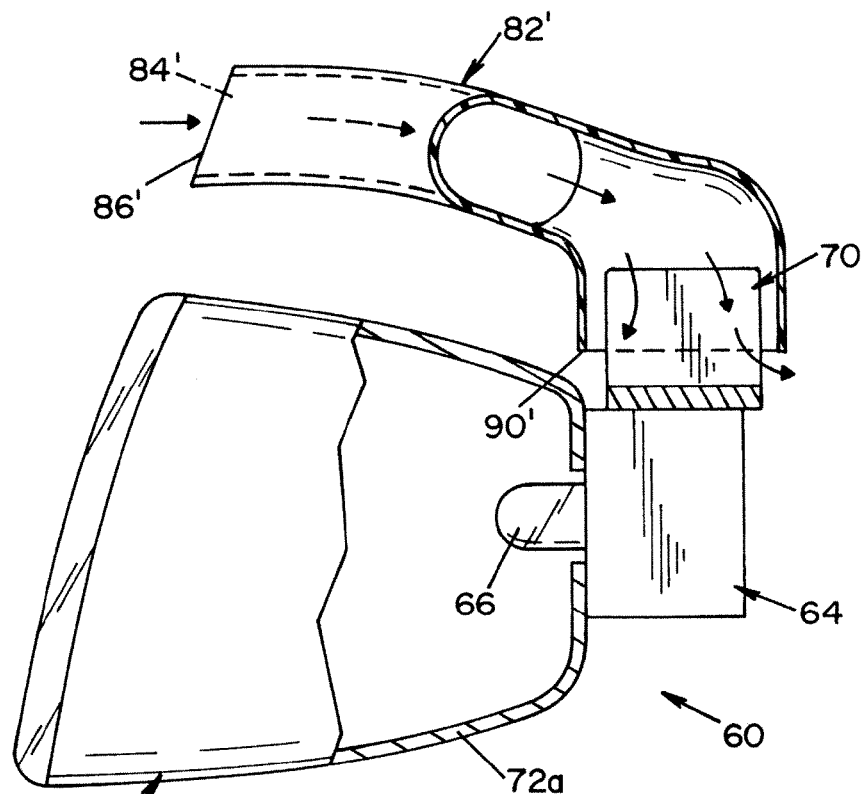
FIG. 8B is a partial cross-sectional view like FIG. 8A, but of the alternative lamp assembly of FIG. 7B.
Figure 7B:
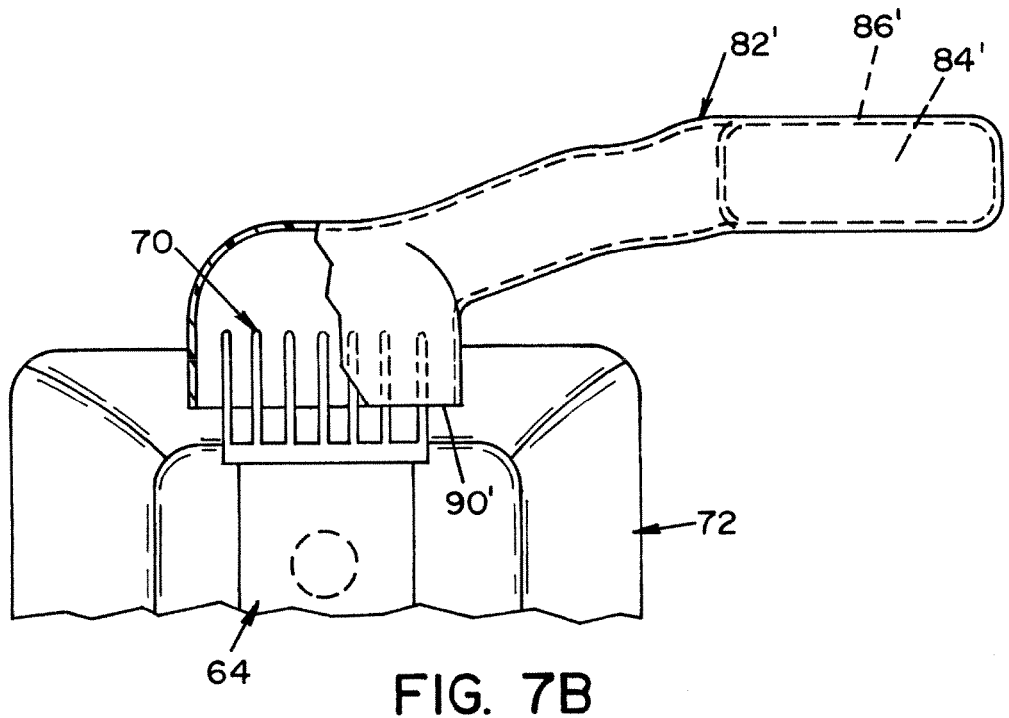
FIG. 7B is a partial rear elevational view like FIG. 7A, but of an alternative lamp assembly having an air guide with a first end positioned higher than a second at the heat sink.
Figure 8A:
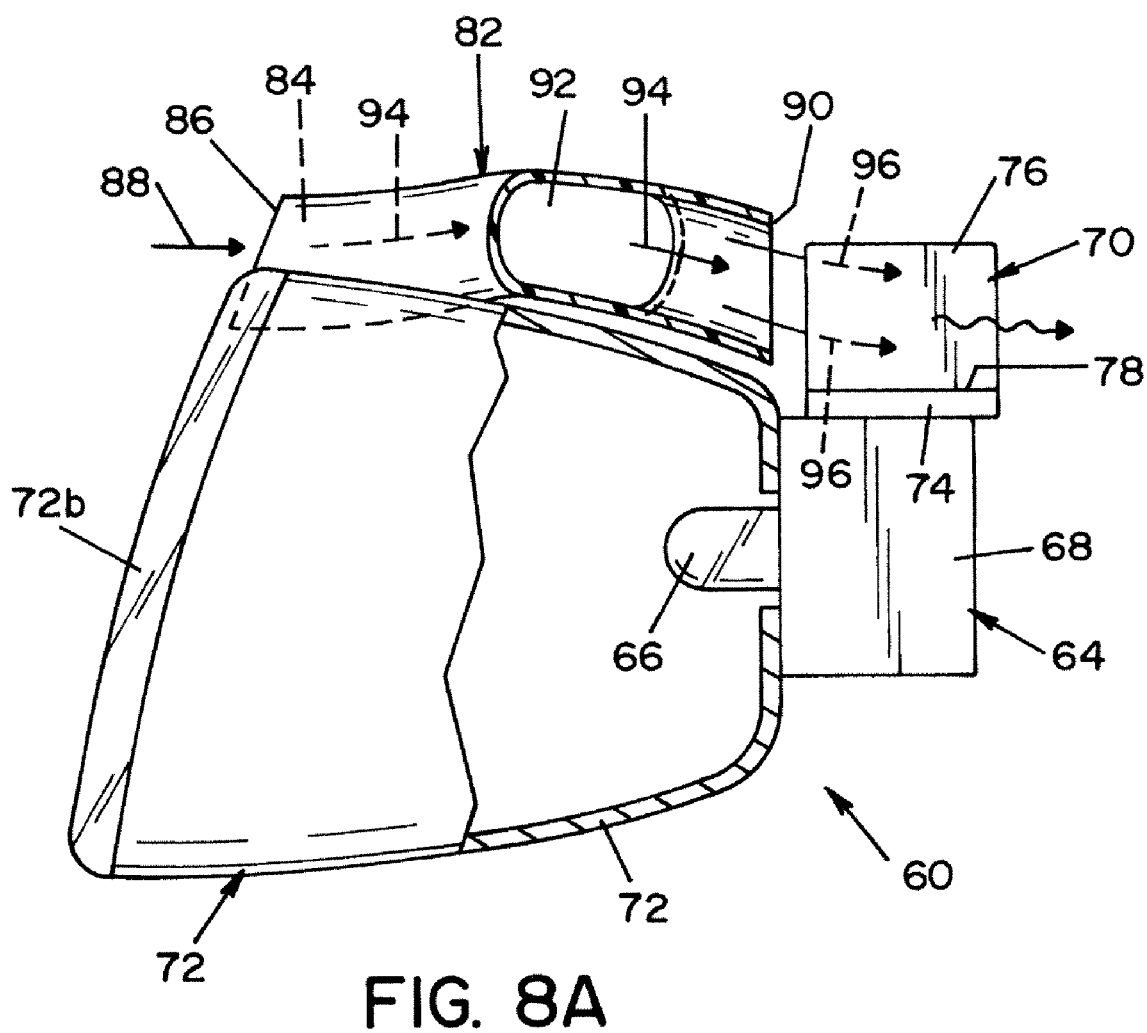
FIG. 8A is a partial cross-sectional view of the lamp assembly of FIG. 6 taken along the line 8-8.

With reference to FIGS. 7B and 8B, an air guide 82' is shown according to an alternate embodiment. In most respects, except as noted hereinbelow, the air guide 82' is the same or similar to the air guide 82 of FIGS. 6, 7A and 8A. In particular, the air guide 82' has an inlet 84' at a first end 86' for receiving an airflow when the vehicle to which the air guide 82' is attached is moving. A second end 90' of the air guide 82' is positioned adjacent and over heat sink 70 for passing airflow to the heat sink to facilitate heat dissipation thereby. The heat sink 70 is thermally coupled to a light source 64 unit for removing heat from the light source unit as already described herein.

Unlike the air guide 82, the air guide 82' is constructed such that its first end 86' is located at a higher position relative to a height of the vehicle to which the air guide 82' is attached than the second end 90' which is at the heat sink 70. In particular, the first end 86' is located sufficiently higher than the second end 90' relative to a height of the vehicle to create a "chimney effect" for dissipating heat from the heat sink 70 through the air guide 82' from the second end 90' to the first end 86' when the vehicle is in a static condition (i.e., not moving). Thus, heat generated by the heat sink 70 will rise through the air guide 82' when no airflow is flowing toward the heat sink 70 (e.g., when the vehicle is stopped). As shown, the second end 90' of the air guide 82' can be over or disposed about the heat sink 70 to encompass or enclose the same for facilitating the chimney effect.

Figure 9:
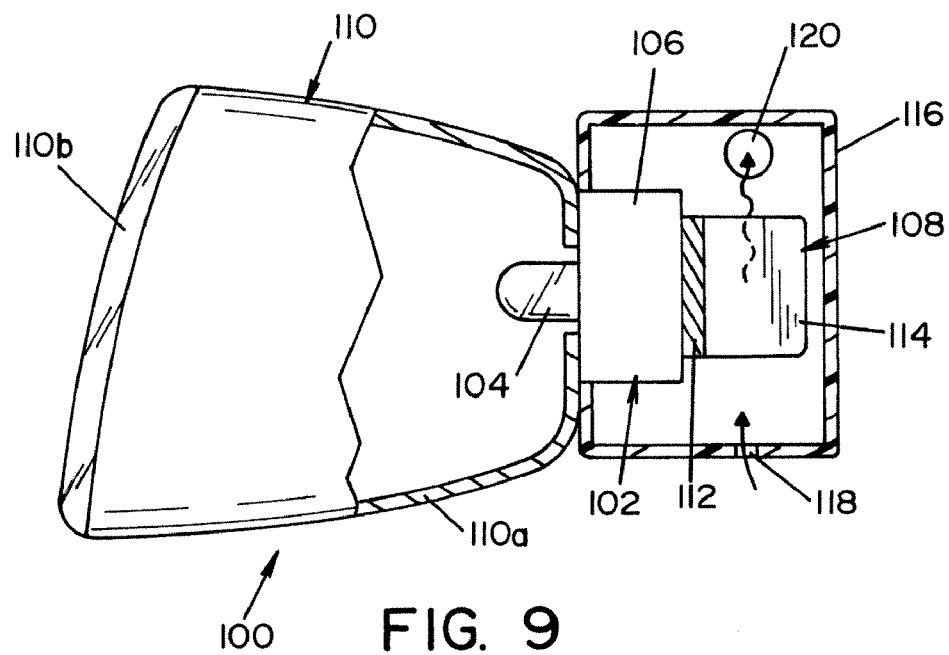
FIG. 9 is a schematic elevational view, partially in cross-section, of a lamp assembly having a heat sink thermally coupled to a light source unit and housed in a protective cover disposed about the heat sink.
Figure 10:
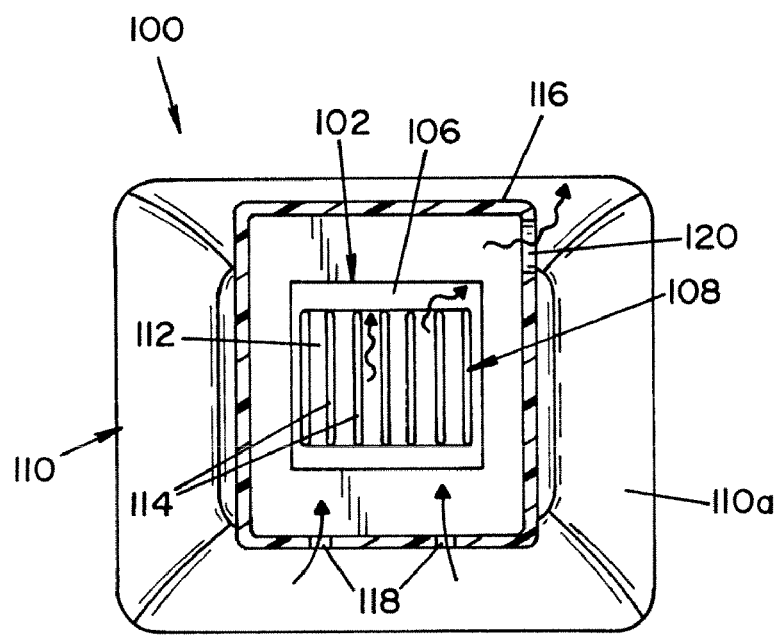
FIG. 10 is a partial cross-sectional plan view of the lamp assembly of FIG. 9.

With reference to FIGS. 9 and 10, a lamp assembly 100 for a vehicle is illustrated. The lamp assembly 100 includes a light source unit 102, which can be a LED light source unit, that is operatively mounted to a vehicle for providing illumination therefor. The light assembly 100 can be, for example, a vehicle head lamp, fog light, or the like, and the light source unit 102 could be a LED package or packages employing one or more LEDs for providing illumination for the vehicle on which the lamp assembly 100 is mounted. As schematically shown, the light source unit 102 can be a LED light source unit including one or more lens portions 104 mounted to a base or support block 106. The support block 106 can contain the remainder of a LED package or packages and/or can house control circuitry for the light source unit 102 and/or electrical connections for powering the same. As will be understood and appreciated by those skilled in the art, the light source unit 102 could alternatively comprise one or more conventional light bulbs or other light emitting devices.

The illustrated lamp assembly 100 includes a heat sink 108 thermally coupled to the light source unit 102 for dissipating heat therefrom. As shown, the light source unit 102 can be mounted to and/or in a lamp housing 110, which can include a main housing portion 110*a* and a lens portion 110*b*. The lens portion or portions 104 can be mounted so as to be positioned within the lamp housing 110 and the support block 106 can be mounted to a rear side of the lamp housing 110 forming together therewith a lamp housing exterior.

As shown, the heat sink 108 is thermally coupled to the light source unit 102 of the lamp assembly 100. In particular, the heat sink 108 can be mounted to the support block 106 for dissipating heat generated by the light source unit 102. Since the support block 106 is mounted to the lamp housing exterior, the heat sink 108 is mounted outside of the lamp housing 110 but is thermally coupled to the light source unit 102, at least a portion of which (i.e., lens portion 104) is mounted or housed within the lamp housing 110. In one exemplary construction, the heat sink 108 can include a main body portion 112 and spaced apart fins 114 extending from the main body portion 112 as illustrated. Alternatively, as will be appreciated by those skilled in the art, the heat sink 108 could be of some other construction suitable for dissipating heat from the light source unit 102.

With the heat sink 108 mounted to the lamp housing exterior, the heat sink 108 and its fins 114 are potentially in position to be exposed to environmental elements (e.g., mud, water, dirt, etc.). To prevent such environmental elements from reaching the heat sink 108 and adversely affecting the performance of the heat sink, a protective cover 116 is provided to house or enclose the heat sink 108. The protective cover 116 protects the otherwise exposed heat sink 108 and its fins 114 from exposure to environmental elements.

To prevent heat buildup from occurring within the protective cover 116, one or more apertures or holes are defined or positioned at optimum locations on the cover 116 for allowing airflow through the cover while preventing or reducing the likelihood of environmental elements from reaching and decreasing the performance of the heat sink 108. In the illustrated embodiment, one or more inlet apertures 118 are defined in the cover 116 and one or more outlet apertures 120 are also defined in the cover 116. In general, the one or more outlet apertures 120 are oriented at positions above or higher than the positions of the one or more inlet apertures 118. As a result, hot air around the heat sink 108, which is somewhat contained by the cover 116, creates an increase in air pressure. Air surrounding the cover 116 is generally cooler than the heated air within the cover 116 surrounding the heat sink 108. The positioning of the apertures 118, 120 allows hot air from within the cover 116 to flow out into the cooler air, and more specifically such hot air is urged out into the cooler air, due to the pressure differential between the hot air within the cover 116 and the surrounding ambient air. This airflow caused by the pressure differential will facilitate cooling of the heat sink fins 114 while protecting the same from exposure to environmental elements.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

I claim:

1. A vehicle lamp assembly comprising:
a light source unit mounted to an associated vehicle for providing illumination; and
a heat sink thermally coupled to said light source unit for dissipating generated heat therefrom, said heat sink having a main body portion, spaced apart fins extending from said main body portion, and an angled surface section on said main body portion disposed between adjacent ones of said spaced apart fins for urging environmental elements to run off said heat sink;
said main body portion including a lower surface from which said fins extend and an opposite surface formed on a side of said main body portion opposite said lower surface, wherein said angled surface section is a portion of said lower surface disposed between adjacent ones of said spaced apart fins, and
wherein said lower surface and said angled surface section are formed in a plane oriented at an acute angle relative to a plane in which said opposite surface is formed.

2. The vehicle lamp assembly of claim 1 wherein said light source unit is one or more LED packages.

3. The vehicle lamp assembly of claim 1 wherein said opposite surface is orthogonally oriented relative to a normal direction of gravity.

4. The vehicle lamp assembly of claim 1 wherein said fins extend at an acute angle from and relative to said angled surface section.

5. The vehicle lamp assembly of claim 1 wherein said light source is housed within a lamp housing and said heat sink is secured to said lamp housing on an exterior thereof so as to be exposed to environmental road conditions.

6. The vehicle lamp assembly of claim 1 further including a protective cover disposed about said heat sink to provide cover from environmental elements.

7. The vehicle lamp assembly of claim 6 wherein said protective cover includes at least one inlet aperture and at least one outlet aperture for creating a chimney effect and removing heat from within said protective cover.

8. A LED lamp assembly for a vehicle, comprising:
a lamp housing mounted to an associated vehicle;
a LED light source unit operatively mounted to said lamp housing;
a heat sink mounted on an exterior of said lamp housing for dissipating heat generated from said LED light source unit, said heat sink including a main body portion and heat dissipating fins upstanding from said main body portion, angled surface sections disposed between each adjacent pair of said heat dissipating fins that are oriented acutely relative to a normal direction of gravity for promoting run off of environmental elements received thereon.

9. The LED lamp assembly of claim 8 wherein said fins extend orthogonally from said angled surface section.

10. The LED lamp assembly of claim 8 wherein said fins extend orthogonally from said main body portion and said angled surface sections.

11. The LED lamp assembly of claim 8 wherein said heat sink is positioned on said lamp housing such that said angled surface sections are angularly disposed relative to a horizontal plane.

12. The LED lamp assembly of claim 8 wherein said heat sink is mounted on a portion of said LED light source unit spaced apart from said lamp housing.

13. A LED lamp assembly for a vehicle, comprising:
a lamp housing mounted to an associated vehicle;
a LED light source unit operatively mounted to said lamp housing;
a heat sink mounted on an exterior of said lamp housing for dissipating heat generated from said LED light source unit, said heat sink including a main body portion, heat dissipating fins upstanding from said main body portion, and angled surface sections disposed between each adjacent pair of said heat dissipating fins for promoting run off of environmental elements received thereon, wherein said main body portion includes an opposite surface formed on a side of said main body portion opposite said angled surface sections, said angled surface sections oriented at an acute angle relative to said opposite surface.

14. The LED lamp assembly of claim 13 wherein said angled surface sections are exposed to road conditions when the associated vehicle is driven.

15. The LED lamp assembly of claim 13 wherein said opposite surface is disposed in a horizontal plane.

16. The LED lamp assembly of claim 13 further including a protective cover disposed about said heat sink to provide cover from environmental elements.

17. The LED lamp assembly of claim 16 wherein said protective cover includes at least one inlet aperture and at least one outlet aperture for creating a chimney effect and removing heat from within said protective cover.

18. A vehicle lamp assembly having a LED light source unit, comprising:
a lamp housing of an associated vehicle;
a LED light source unit operatively mounted in said lamp housing for providing illumination; and
a heat sink thermally connected to said light source unit and mounted to an exterior of said lamp housing so as to be exposed to the environment, said heat sink including:
a main body portion having a lower surface;
an opposite surface formed on a side of said main body portion opposite said lower surface, said lower surface oriented at an acute angle relative to said opposite surface,
spaced apart fins extending upwardly from said lower surface of said main body portion for dissipating heat generated by said light source unit, and
surface sections of said lower surface defined between adjacent ones of said spaced apart fins, said surface sections angularly oriented relative to a horizontal plane for urging and promoting environmental elements off of said heat sink.

19. The vehicle lamp assembly of claim 18 wherein said surface sections are disposed in a single plane angularly oriented relative to said horizontal plane.

20. A vehicle lamp assembly having a LED light source unit, comprising:
a lamp housing of an associated vehicle;
a LED light source unit operatively mounted in said lamp housing for providing illumination;
a heat sink thermally connected to said light source unit and mounted to an exterior of said lamp housing so as to be exposed to the environment, said heat sink including:
a main body portion having a lower surface,
spaced apart fins extending upwardly from said lower surface of said main body portion for dissipating heat generated by said light source unit, and
surface sections of said lower surface defined between adjacent ones of said spaced apart fins, said surface sections angularly oriented relative to a horizontal plane for urging and promoting environmental elements off of said heat sink; and
a protective cover disposed about said heat sink to provide cover from environmental elements.

21. The vehicle lamp assembly of claim 20 wherein said protective cover includes at least one inlet aperture and at least one outlet aperture for creating a chimney effect and removing heat from within said protective cover.

* * * * *